United States Patent
Mizumoto et al.

(10) Patent No.: US 9,965,406 B2
(45) Date of Patent: May 8, 2018

(54) SETTING METHOD, COMMUNICATION DEVICE, AND MASTER DEVICE

(71) Applicant: OMRON Corporation, Kyoto-shi, Kyoto (JP)

(72) Inventors: Hirohito Mizumoto, Kyoto (JP); Satoshi Yamawaki, Ritto (JP); Kayoko Isogai, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 196 days.

(21) Appl. No.: 14/950,001

(22) Filed: Nov. 24, 2015

(65) Prior Publication Data

US 2016/0292104 A1 Oct. 6, 2016

(30) Foreign Application Priority Data

Mar. 31, 2015 (JP) ................................ 2015-074290

(51) Int. Cl.
*G06F 13/14* (2006.01)
*G06F 11/30* (2006.01)
(Continued)

(52) U.S. Cl.
CPC .......... *G06F 13/14* (2013.01); *G06F 11/3051* (2013.01); *G06F 13/362* (2013.01);
(Continued)

(58) Field of Classification Search
CPC ........ G06F 13/10; G06F 13/12; G06F 13/128; G06F 13/14; G06F 13/38; G06F 13/40; G06F 13/4004; G06F 13/42; G06F 13/4265; G06F 15/163; G06F 15/173; G06F 15/17337; G06F 15/17343; G06F 15/1735; G06F 15/177; G06F 11/3051; G06F 13/385; H04L 41/08; H04L 41/0803; H04L 41/0813; H04L 41/085; H04L 41/0853; H04L 41/0866; H04L 41/0886; H04L 41/0889
See application file for complete search history.

(56) References Cited

U.S. PATENT DOCUMENTS 6,457,055 B1 * 9/2002 Hwong ............. H04L 12/40136
370/242
7,570,657 B1 * 8/2009 Lo ....................... H04L 49/3054
370/465

(Continued)

FOREIGN PATENT DOCUMENTS

JP   H09-128019 A   5/1997
JP   2014-119907 A  6/2014

*Primary Examiner* — Thomas J Cleary
(74) *Attorney, Agent, or Firm* — Metrolexis Law Group, PLLC (57) ABSTRACT

Delay in establishing communication is suppressed in a network system including a master device and a slave device. Provided is a setting method for performing communication setting for at least one of a master device and a slave device serving as a target device, the method including a storage step of storing a value of a communication parameter in a state in which the target device has established communication, and a setting step of, in communication setting in a preparatory stage for the target device to start communication, setting the value of the communication parameter that was stored in the storage step.

9 Claims, 8 Drawing Sheets

(51) Int. Cl.
  *G06F 13/362* (2006.01)
  *H04L 12/24* (2006.01)
  *H04L 12/40* (2006.01)
  *H04L 12/413* (2006.01)

(52) U.S. Cl.
  CPC .... *H04L 12/40169* (2013.01); *H04L 41/0813* (2013.01); *H04L 41/0853* (2013.01); *H04L 41/0886* (2013.01); *H04L 41/0889* (2013.01); *H04L 12/413* (2013.01); *H04L 41/083* (2013.01)

(56) References Cited

U.S. PATENT DOCUMENTS

| | | | |
|---|---|---|---|
| 2003/0012294 A1* | 1/2003 | Nakamura | H04L 12/4013 375/295 |
| 2003/0174726 A1* | 9/2003 | Dove | H04L 41/0896 370/463 |
| 2003/0198247 A1* | 10/2003 | Gardner | H04L 5/1446 370/445 |
| 2007/0174526 A1* | 7/2007 | Blackwell | G06F 13/12 710/73 |
| 2011/0289176 A1* | 11/2011 | Toyama | H04L 12/40006 709/211 |
| 2014/0022891 A1* | 1/2014 | Matityahu | H04L 43/12 370/225 |
| 2014/0119381 A1 | 5/2014 | Diab et al. | |

\* cited by examiner

SETTING METHOD, COMMUNICATION DEVICE, AND MASTER DEVICE

CROSS-REFERENCES TO RELATED APPLICATIONS

This application claims priority to Japanese Patent Application No. 2015-074290 filed Mar. 31, 2015, the entire contents of which are incorporated herein by reference.

FIELD

The present invention relates to a setting method in a network system in which a master device and a slave device are connected by a cable, for performing communication setting relating to communication with a target device, the target device being at least one of the master device and the slave device, a communication device that functions as the master device or the slave device, and a master device that performs communication setting relating to communication of the slave device.

BACKGROUND

Network systems constituted by a master device and a slave device are used as network systems for industrial use, and techniques relating to such network systems have been disclosed.

For example, JP 2014-119907A discloses a communication unit communicably connected by a system bus to multiple slave devices that operate based on setting information. Upon determining that the system configuration is a configuration indicated by stored configuration information, the communication unit transmits setting information included in the configuration information to the slave devices. For this reason, JP 2014-119907A describes that the communication unit can prevent unexpected operations from occurring in the network system.

Also, JP H9-128019A discloses a remote I/O system including a remote master and multiple IN slaves and OUT slaves connected via a communication cable to the remote master. In the remote I/O system, the remote master collectively transmits OUT data to the slaves, and the OUT slaves receive the OUT data at respective node times. Meanwhile, based on the times at which the OUT data is received, the IN slaves sequentially transmit IN data at respective node times each time a basic idle period obtained with consideration given to frame length and physical delay elapses. The remote master receives the IN data from the IN slaves in time slots based on the basic idle period. For this reason, JP H9-128019A describes that overlapping of IN data due to physical delay in the communication cable or the like no longer occurs.

JP 2014-119907A and JP H9-128019A are examples of background art.

Figure 8A:
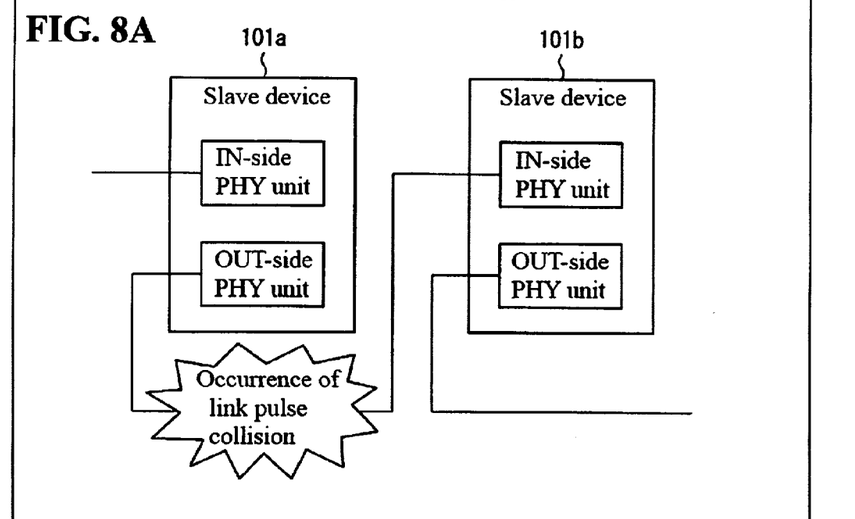
FIGS. 8A and 8B are diagrams showing processing for communication in which the problem of two slave devices taking time to establish a link occurs in the conventional technology, FIG. 8A being a diagram showing a state in which link pulses collide, and FIG. 8B being a diagram showing times at which the two slave devices transmit link pulses.
Figure 8B:
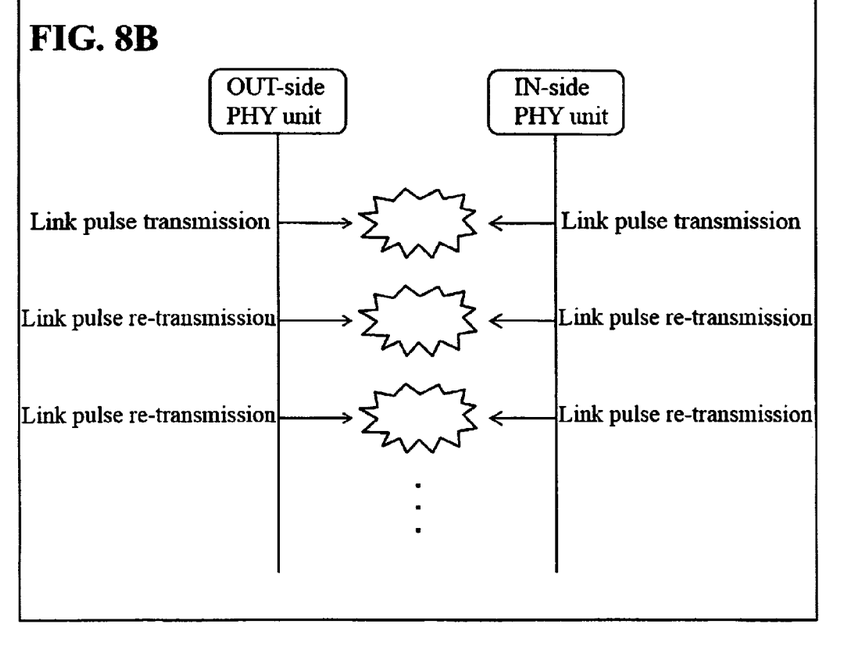

However, the above-described conventional techniques are problematic in that there are cases where establishing a link in the network system takes time when multiple slave devices are powered on at the same time, for example. This problem will be described with reference to FIGS. 8A and 8B. FIGS. 8A and 8B are diagrams showing communication processing in which the problem of two slave devices taking time to establish a link occurs in the conventional technology. FIG. 8A is a diagram showing a state in which link pulses collide, and FIG. 8B is a diagram showing times at which the two slave devices transmit link pulses.

In the network system shown in FIG. 8A, an OUT-side PHY (Physical Layer) unit of a slave device 101a and an IN-side PHY unit of a slave device 101b are connected. In this state, if the slave device 101a and the slave device 101b are powered on at the same time, the OUT-side PHY unit of the slave device 101a and the IN-side PHY unit of the slave device 101b both execute Auto MDI/MDI-X. In this case, as shown in FIG. 8B, if the OUT-side PHY unit of the slave device 101a and the IN-side PHY unit of the slave device 101b transmit link pulses at the same time, a link pulse collision occurs between the slave device 101a and the slave device 101b as shown in FIG. 8A. Note that Auto MDI/MDI-X is a known technique for network systems conforming to the Ethernet (registered trademark) standard, and thus description thereof is not included here.

If the slave device 101a and the slave device 101b cannot receive link pulses from each other for a predetermined amount of time, the link pulses are retransmitted. In this case as well, if the OUT-side PHY unit of the slave device 101a and the IN-side PHY unit of the slave device 101b retransmit the link pulses at the same time as shown in FIG. 8B, a link pulse collision occurs between the slave device 101a and the slave device 101b as shown in FIG. 8A.

Thus, if link pulses collide, the slave devices retransmit the link pulses, and this processing is repeated until a link is established. In particular, if the IN-side PHY units and OUT-side PHY units of the slave devices are provided with the same physical layer circuit, the times at which the link pulses are transmitted and retransmitted are likely to be the same, and link pulse collisions are more likely to occur. In this case, due to variation in the properties of oscillators and other components of the physical layer circuits and differences in temperature, the times at which the physical layer circuits retransmit the link pulses diverge from each other little by little and a link is ultimately established, but this takes time.

SUMMARY

The present invention is made in view of the above problems, and a main objective thereof is to provide a technique for suppressing delay in establishing communication in a network system including a master device and a slave device.

In order to resolve the foregoing problem, a setting method according to one aspect of the present invention is a setting method in a network system in which a master device and a slave device are connected by a cable, for performing communication setting relating to communication with a target device, the target device being at least one of the master device and the slave device, wherein a communication parameter relating to the communication setting is at least one of a port type, communication speed, and full-duplex/half-duplex, the method including: a storage step of storing a value of the communication parameter in a state in which the target device has established communication; and a setting step of setting the value of the communication parameter stored in the storage step in communication setting in a preparatory stage for the target device to start communication.

According to the above-described configuration, if there is no change in the configuration of the network system, the target device can communicate with a communication destination (other device) due to the stored value of the communication parameter being set in the target device. Thus, the target device does not need to perform processing for checking the setting of the communication destination (other device) or re-checking processing caused by a link pulse collision that occurs during the processing, and thus delay in establishing communication in the network system can be suppressed.

Also, in the setting method of the present invention, if the target device cannot establish communication in a predetermined amount of time, the set value of the communication parameter may be changed to a different value in the setting step.

According to the above-described configuration, even if there is a change in the configuration of the network system, the target device does not need to perform processing for checking the setting of the communication destination (other device) or re-checking processing caused by a link pulse collision that occurs during the processing, and thus a delay in the establishment of communication in the network system can be suppressed.

Also, in the setting method of the present invention, the target device may include a target device setting unit configured to check a communication setting of a communication destination and perform communication setting such that communication with a communication destination can be established, and in the setting step, if the target device cannot establish communication in a predetermined amount of time, the target device setting unit performs setting for the target device.

According to the above-described configuration, even if communication cannot be established after the value of the communication parameter is set, it is possible to avoid falling into a state in which the target device cannot establish communication.

Also, in order to resolve the foregoing problems, a communication device according to one aspect of the present invention is a communication device configured to, in a network system in which a master device and a slave device are connected by a cable, function as the master device or the slave device and perform communication setting relating to communication of the communication device, wherein a communication parameter relating to the communication setting is at least one of a port type, communication speed, and full-duplex/half-duplex, the communication device including: a storage unit configured to store a value of the communication parameter relating to the communication setting in a state in which communication has been established; and a setting unit configured to set the value of the communication parameter stored in the storage unit in the communication setting in a preparatory stage for the communication device to start communication.

According to the above-described configuration, if there is no change in the configuration of the network system, the communication device functioning as the master device or the slave device can communicate with a communication destination (other device) due to the stored value of the communication parameter being set in the communication device. Accordingly, the communication device does not need to perform processing for checking the setting of the communication destination or re-checking processing caused by a link pulse collision that occurs during the processing, and thus delay in establishing communication can be suppressed.

Also, in order to resolve the foregoing problem, a master device according to one aspect of the present invention is a master device configured to, in a network system in which the master device and a slave device are connected by a cable, perform communication setting relating to communication of the slave device, wherein a communication parameter relating to the communication setting is at least one of a port type, communication speed, and full-duplex/half-duplex, the master device including: a storage unit configured to store values of communication parameters in a state in which the slave device has established communication with the master device and communication through one or more ports that are different from a port through which the slave device communicates with the master device has been established, the communication parameters being set for the one or more ports; and a setting unit configured to, if the slave device cannot establish communication through one of the one or more ports in a predetermined amount of time, set the values of the communication parameters stored in the storage unit for the one or more ports through which communication could not be established, the values of the communication parameters corresponding to the one or more ports through which communication could not be established.

According to the above-described configuration, if there is no change in the configuration of the network system, one or more ports of the slave device can communicate with a communication destination due to the stored values of the communication parameters being set in the slave device. Accordingly, the slave device does not need to perform processing for checking the setting of the communication destination or re-checking processing caused by a link pulse collision that occurs during the processing, and thus delay in establishing communication in a slave device provided with one or more port can be suppressed.

The present invention can suppress delay in establishing communication in a network system including a master device and a slave device.

DETAILED DESCRIPTION

Embodiment 1

Hereinafter, Embodiment 1 of the present invention will be described in detail with reference to FIGS. 1 to 5.

Configuration of Network System 1

Figure 1:
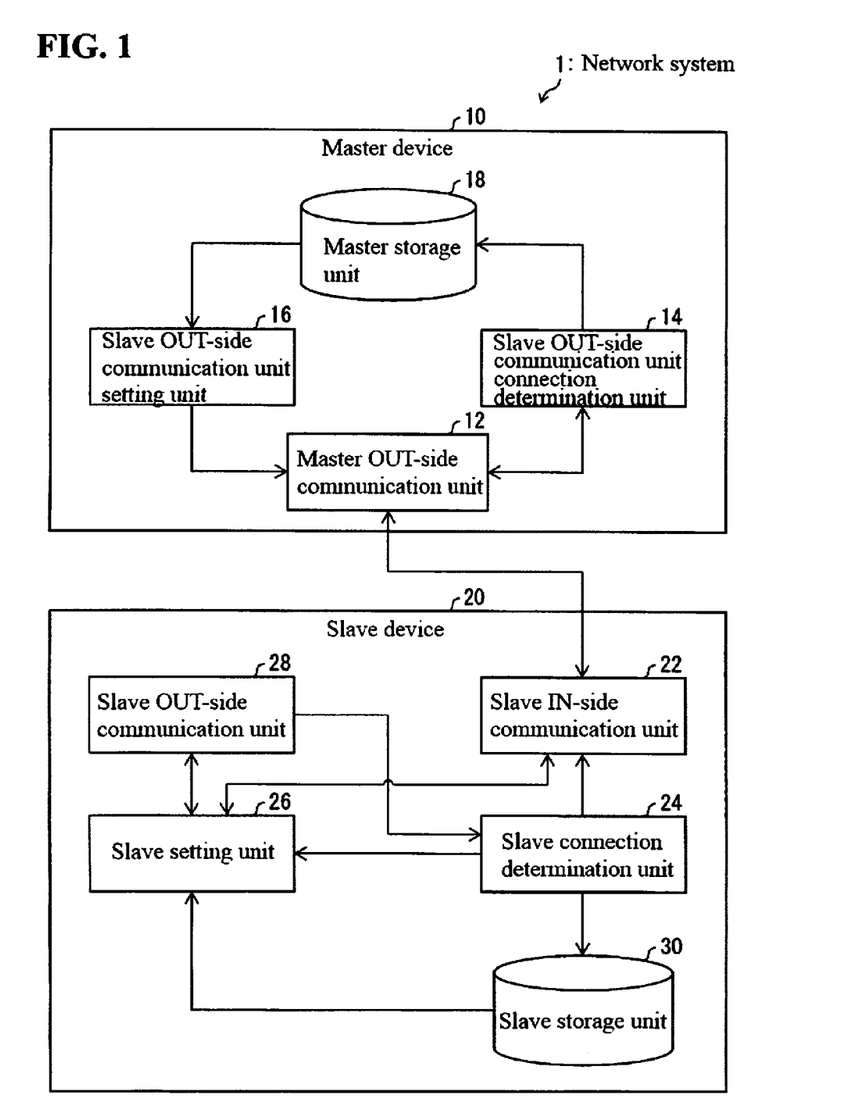
FIG. 1 is a block diagram showing a configuration of relevant portions of a network system according to Embodiment 1 of the present invention.

FIG. 1 is a block diagram showing a configuration of relevant portions of a network system 1 according to Embodiment 1 of the present invention. As shown in FIG. 1, the network system 1 is constituted by a master device 10 and a slave device (target device) 20.

The network system 1 is such that the master device 10 and the slave device 20 are connected by a cable. In the network system 1, the value for at least one of the port type (indicates the interface type of the communication port, and is set to "MDI" or "MDI-X"), communication speed, and half-duplex/full-duplex, which are communication parameters relating to communication setting, is set in communication setting in a preparatory stage for the slave device 20 to start communication. In the present embodiment, a case will be described in which the communication parameter is the port type.

Also, in the network system 1, the value of the communication parameter in a state in which the slave device 20 has established communication is stored in advance, and the value is set during communication setting in a preparatory stage for the slave device 20 to start communication. Also, examples of "a preparatory stage for the slave device 20 to start communication" may include any of (1) a time when the slave device 20 is powered on, (2) a time when a communication destination device of the slave device 20 resumes communication, and (3) a time when a cable is connected to the slave device 20.

Note that in the present specification, a case will be described in which the network system 1 is a network system conforming to the EtherCAT (registered trademark) standard, but the present invention is not limited thereto. The network system 1 may be a network system conforming to a standard such as MECHATROLINK (registered trademark), EtherNet/IP, or CC-Link (registered trademark), for example.

Also, in the network system 1 shown in FIG. 1, one slave device 20 is connected to the master device 10, but a configuration is also possible in which multiple slave devices 20 are connected to the master device 10. A configuration in which multiple slave devices 20 are connected to the master device 10 will be described later with reference to a different drawing.

Master Device 10

As shown in FIG. 1, the master device 10 includes a master OUT-side communication unit 12, a slave OUT-side communication unit connection determination unit 14, a slave OUT-side communication unit setting unit (setting unit) 16, and a master storage unit (storage unit) 18.

The master OUT-side communication unit 12 is provided with a function of communicating with the connected slave device 20.

The slave OUT-side communication unit connection determination unit 14 determines whether or not communication with a communication destination (another device) has been established by a slave OUT-side communication unit 28, which is a communication unit in the slave device 20 that is different from the communication unit that communicates with the master device 10.

The slave OUT-side communication unit setting unit 16 sets the value of the communication parameter for the slave OUT-side communication unit 28.

The master storage unit 18 is a memory capable of storing data.

Note that in the present embodiment, a configuration is used in which the value of the communication parameter is stored in the slave device 20, and a configuration in which the value of the communication parameter is stored in the master device 10 will be described in a later-described embodiment.

Slave Device 20

As shown in FIG. 1, the slave device 20 includes a slave IN-side communication unit 22, a slave connection determination unit 24, a slave setting unit (target device setting unit, setting unit) 26, the slave OUT-side communication unit 28, and a slave storage unit (storage unit) 30.

The slave IN-side communication unit 22 is provided with a function of communicating with the connected master device 10 due to the communication parameter being set therefor.

The slave connection determination unit 24 determines whether or not communication with communication destinations (other devices) has been established by the slave IN-side communication unit 22 and/or the slave OUT-side communication unit 28. Also, the slave connection determination unit 24 is provided with a function of acquiring communication parameters set for the slave IN-side communication unit 22 and the slave OUT-side communication unit 28.

The slave setting unit 26 sets the respective communication parameters for the slave IN-side communication unit 22 and the slave OUT-side communication unit 28. Also, the slave setting unit 26 is provided with a function of checking communication settings of the communication destinations for the slave IN-side communication unit 22 and the slave OUT-side communication unit 28 and performing communication setting such that communication with the communication destinations can be established.

The slave OUT-side communication unit 28 is provided with a function of communicating with a connected communication device due to a communication parameter being set therefor. Note that as described in a later-described configuration example, a configuration is also possible in which the slave device 20 includes multiple slave OUT-side communication units 28.

The slave storage unit 30 is a memory capable of storing data.

Configuration Example 1 of Network System 1

Figure 2:
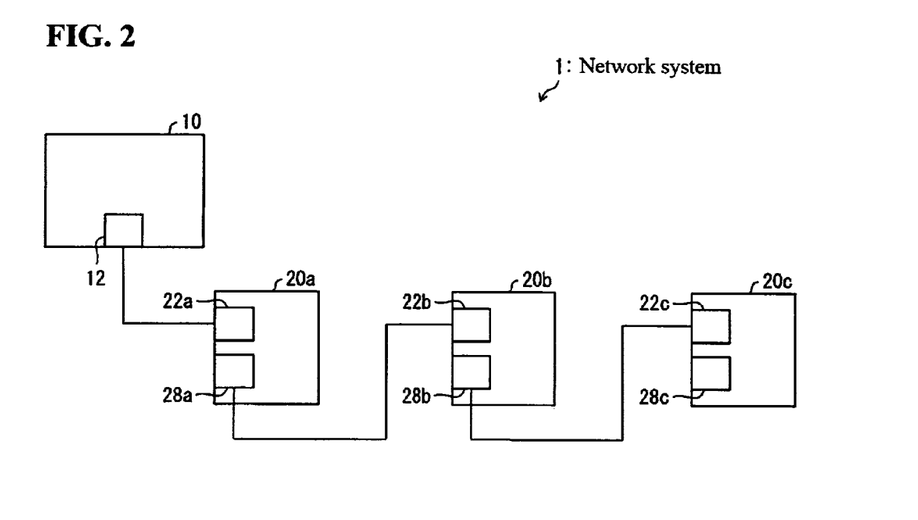
FIG. 2 is a diagram showing an example of a configuration of a network system according to Embodiment 1 of the present invention.

As described above, the configuration of the network system 1 may be a configuration in which multiple slave devices 20 are connected to the master device 10. A configuration example of a network system 1 employing this configuration will be described with reference to FIGS. 2 and 3. FIG. 2 is a diagram showing an example of a configuration of the network system 1 according to Embodiment 1 of the present invention.

The network system 1 shown in FIG. 2 has a configuration in which multiple slave devices (slave device 20a, slave device 20b, slave device 20c) are connected in series to the master device 10 (a daisy chain configuration). More specifically, as shown in FIG. 2, in the connection between the master device 10 and the slave device 20a, the master OUT-side communication unit 12 of the master device and the slave IN-side communication unit 22a of the slave device 20a are connected by a cable. Also, as shown in FIG. 2, in the connection between the slave devices, the slave OUT-side communication unit 28a of the slave device 20a and the slave IN-side communication unit 22b of the slave device 20b are connected by a cable. The configuration is similar for the connection between the slave device 20b and the slave device 20c.

Note that the network system 1 shown in FIG. 2 has a daisy chain configuration, but a ring topology configuration may be used as well. To turn the network system 1 shown in FIG. 2 into a ring topology configuration, it is sufficient that the slave OUT-side communication unit 28c of the slave device 20c and the master IN-side communication unit (not shown) of the master device 10 are connected by a cable.

Configuration Example 2 of Network System 1

Figure 3:
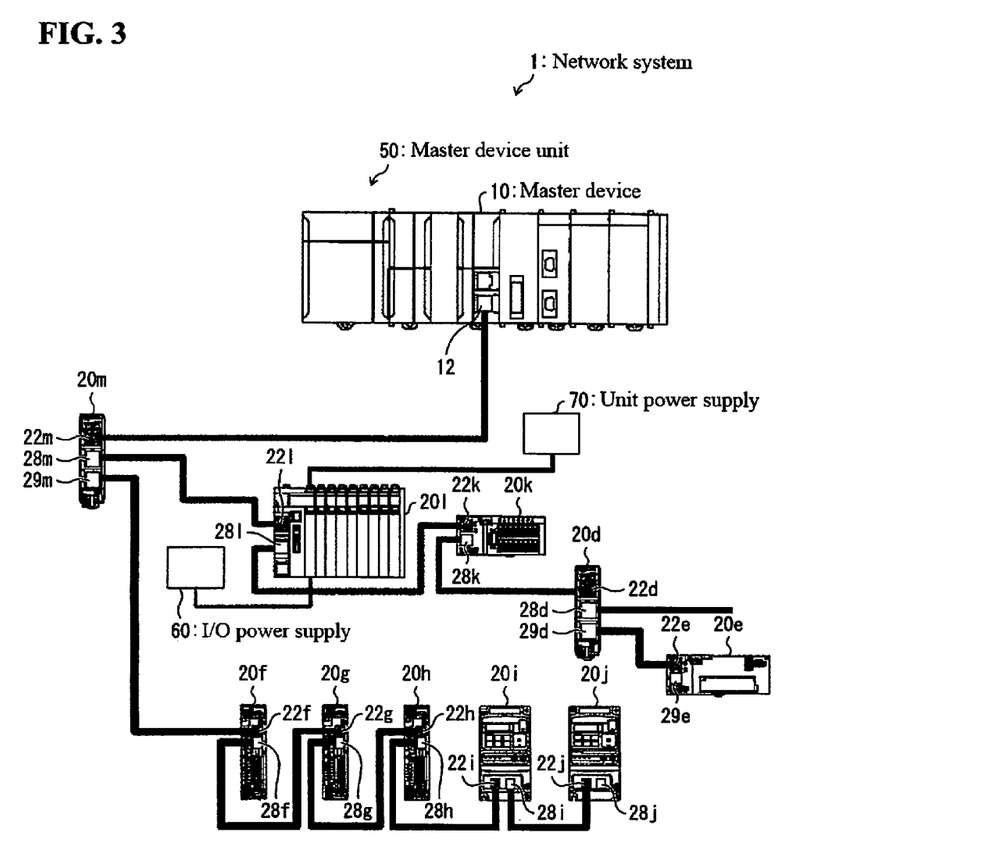
FIG. 3 is a diagram showing another example of a configuration of a network system according to Embodiment 1 of the present invention.

Also, FIG. 3 is a diagram showing another example of a configuration of the network system 1 according to Embodiment 1 of the present invention.

As shown in FIG. 3, the network system 1 includes, as slave devices, a branching slave 20d and a branching slave 20m that include multiple slave OUT-side communication units (28d, 29d, 28m, 29m), a slave terminal 201 that includes an I/O power supply 60 and a unit power supply 70, a digital I/O slave 20k, an analog I/O slave 20e, servo drivers 20f to 20h, and inverters 20i and 20j. Thus, there is no limitation on the type of the slave devices included in the network system 1, as long as they are slave devices that conform to the EtherCAT standard.

Figure 4:
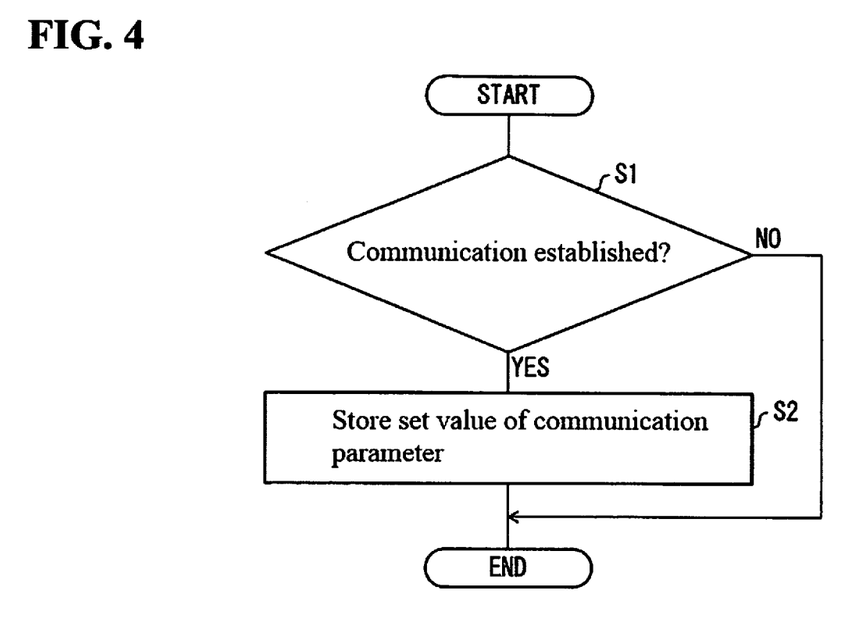
FIG. 4 is a flowchart showing a flow of processing for storing a value of a communication parameter in a slave device, according to Embodiment 1 of the present invention.

Processing of the Slave Device 20: Setting Method for Performing Communication Setting Processing for storing the value of the communication parameter in the slave device 20 will be described with reference to FIG. 4. FIG. 4 is a flowchart showing a flow of processing for storing a value of a communication parameter in a slave device 20, according to Embodiment 1 of the present invention.

Step S1

The slave connection determination unit 24 of the slave device 20 determines whether or not the slave IN-side communication unit 22 has established communication.

Step S2: Storage Step

If it is determined that "communication has been established" in step S1 (step S1: YES), the slave connection determination unit 24 stores the value of the communication parameter set for the slave IN-side communication unit 22 in the slave storage unit 30.

After the processing of step S2, or if it is determined in step S1 that "communication has not been established" (step S1: NO), the processing of the slave device 20 shown in FIG. 4 ends.

Note that the processing for storing the value of the communication parameter in the slave device 20 is not limited to the above-described configuration. For example, the slave IN-side communication unit 22 may be configured to determine whether or not communication was established by the slave IN-side communication unit 22 (configuration A), or the master device 10 may be configured to determine whether or not communication was established by the slave IN-side communication unit 22 (configuration B).

In the case of the configuration A, if it is determined that communication has been established by the slave IN-side communication unit 22, the slave IN-side communication unit 22 stores the value of the communication parameter set for the slave IN-side communication unit 22 in the slave storage unit 30.

In the case of the configuration B, if the master device 10 determines that communication has been established by the slave IN-side communication unit 22, the slave connection determination unit 24 is instructed to store the communication parameter set for the slave IN-side communication unit 22.

Figure 5:
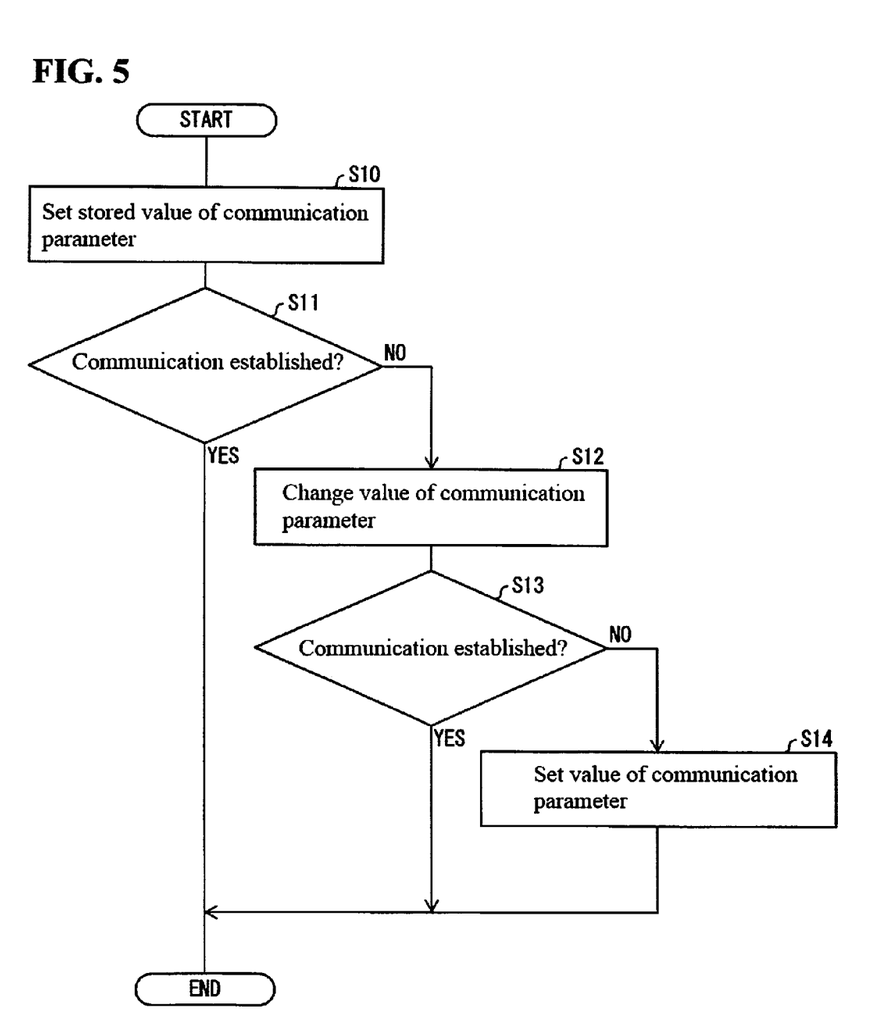
FIG. 5 is a flowchart showing a flow of processing in a preparatory stage for a slave device to start communication, according to Embodiment 1 of the present invention.

Next, communication setting in a preparatory stage for the slave device 20 to start communication will be described with reference to FIG. 5. FIG. 5 is a flowchart showing a flow of processing in a preparatory stage for the slave device 20 to start communication, according to Embodiment 1 of the present invention.

Step S10: Setting Step

Upon reaching a preparatory stage for the slave device 20 to start communication, the slave setting unit 26 acquires the value of the communication parameter stored in the slave storage unit 30. Then, the slave setting unit 26 sets the acquired value of the communication parameter for the slave IN-side communication unit 22.

Step S11

The slave connection determination unit 24 determines whether or not communication of the slave IN-side communication unit 22 has been established. Note that in the processing of step S11, it is preferable to use a configuration in which after the processing of step S10 is executed, step S11 is executed until a predetermined amount of time (e.g., 5 seconds) elapses. Furthermore, the slave connection determination unit 24 is preferably configured to end the processing of step S11 if it is determined that "communication was established" (step S11: YES). Note that in the processing described below as well, it is preferable to use a configuration in which after the execution of prior processing, the processing for determining whether or not communication was established is executed until a predetermined amount of time (e.g., 5 seconds) elapses, and it is further preferable to use a configuration in which the processing for determining whether or not communication was established is ended if the communication is established.

Step S12

If it is determined in step S11 that "communication has not been established" (step S11: NO), the slave setting unit 26 changes the value of the communication parameter set in step S10 to a different value. For example, if the slave setting unit 26 set port type "MDI" for the slave IN-side communication unit 22 in step S10, the slave setting unit 26 sets port type "MDI-X" for the slave IN-side communication unit 22 in step S12.

Step S13

The slave connection determination unit 24 determines whether or not communication of the slave IN-side communication unit 22 has been established.

Step S14

If it is determined in step S13 that "communication has not been established" (step S13: NO), the slave setting unit 26 sets the value of the communication parameter corresponding to the communication setting of the communication destination with which the slave IN-side communication unit 22 communicates for the slave IN-side communication unit 22. "Auto MDI/MDI-X" for a network system conforming to an Ethernet standard is an example of the processing of step S14.

After the processing of step S14, if it was determined in step S11 that "communication was established", or if it was determined in step S13 that "communication was established", the processing of the slave device 20 shown in FIG. 5 ends.

Thus, in the network system 1 according to the present embodiment, the slave device 20 stores the value of the communication parameter in a state in which the slave device 20 has established communication. Then, in communication setting in the preparatory stage for starting communication, the slave device 20 sets the value of the communication parameter that was stored in advance. For this reason, in the network system 1, if there is no change in the configuration (master device 10, slave device 20, cable, etc.), the slave device 20 can communicate with a communication destination due to the value of the communication parameter that was stored in advance being set in the slave device 20. Accordingly, in the network system 1, there is no need to perform processing for checking the setting of the communication destination or re-checking processing caused by a link pulse collision that occurs during the processing, and thus delay in establishing communication can be suppressed.

Also, in the network system 1, if communication cannot be established for a predetermined amount of time after the value of the communication parameter that was stored in advance is set in the slave device 20, the slave device 20 changes the set value of the communication parameter to a different value. For this reason, even if there is a change in the configuration of the network system 1, there is no need to perform processing for checking the setting of the communication destination or re-checking processing caused by a link pulse collision that occurs during the processing, and thus delay in establishing of communication can be suppressed.

Also, in the network system 1, if communication cannot be established for a predetermined amount of time after the value of the communication parameter is set (e.g., if the communication destination device is powered on after the slave device 20 sets the value of the communication parameter), the slave device 20 checks the setting of the communication destination and performs communication setting such that communication with the communication destination can be established. For this reason, in the network system 1, even if communication cannot be established after the value of the communication parameter is set by the slave device 20, it is possible to avoid falling into a state in which the slave device 20 cannot establish communication.

Note that it is also possible to use a configuration in which in the above-described processing of the slave device 20, the processing of step S14 is executed if it is determined in step S11 that "communication has not been established" (step S12: NO).

Also, in the present embodiment, a configuration was described in which the slave device 20 stores the value of the communication parameter and the value of the communication parameter is set in the communication setting, but the present invention is not limited to this configuration. For example, a configuration may be used in which the master device (target device) 10 stores the value of the communication parameter in a state in which the master device 10 has established communication, and sets the value of the communication parameter that was stored in advance in communication setting in a preparatory stage for starting communication. Also, it is possible to use a configuration in which the master device 10 and the slave device 20 store the value of the communication parameter in a state in which the master device 10 and the slave device 20 have established communication and set the value of the communication parameter that was stored in advance in the communication setting in a preparatory stage for starting communication. In other words, the present invention can be applied to any communication device that functions as the master device 10 or the slave device 20.

Also, in the present embodiment, a case was described in which the slave setting unit 26 sets the value of the communication parameter for the slave IN-side communication unit 22, but the present invention is not limited to this configuration. For example, it is also possible to use a configuration in which the slave setting unit 26 sets the value of the communication parameter for at least one of the slave IN-side communication unit 22 and the slave OUT-side communication unit 28.

Modified Example

As described above, the communication parameter of the present invention is at least one of the port type, communication speed, and half-duplex/full-duplex. In the present modified example, a case will be described in which the communication parameter is the communication speed. Also, in the present modified example, the slave device 20 executes processing in accordance with the flowcharts shown in FIGS. 4 and 5 above.

If the slave setting unit 26 sets communication speed "10BASE-T" for the slave IN-side communication unit 22 in step S10 described above, the slave setting unit 26 sets communication speed "100BASE-TX" in step S12.

In this configuration, communication speed "1000BASE-T" can also be set for the slave IN-side communication unit 22, and if it is determined in step S13 that "communication has not been established" (step S13: NO), the processing of the slave device 20 returns to the processing of step S12. Then, the slave setting unit 26 sets a value ("1000BASE-T") that is different from the values that were set ("10BASE-T" and "100BASE-TX"). Thus, a configuration may be used in which the processing of step S12 and step S13 is repeatedly executed until the slave setting unit 26 has set all of the settable values.

Also, the processing for checking the communication speed and half-duplex/full-duplex of the communication destination in step S14 may be a known technique called "auto-negotiation" in a conventional network system conforming to the Ethernet (registered trademark) standard.

Thus, in the communication setting in a preparatory stage for starting communication, with regard to at least one of the port type, communication speed, and half-duplex/full-duplex, the slave device 20 sets the value of the communication parameter that was stored in advance. For this reason, in the setting of the port type, communication speed, and half-duplex/full-duplex, it is not necessary to perform processing for checking the setting of the communication destination or re-checking processing caused by a link pulse collision that occurs in the processing, and delay in establishing communication can be suppressed.

Embodiment 2

Figure 6:
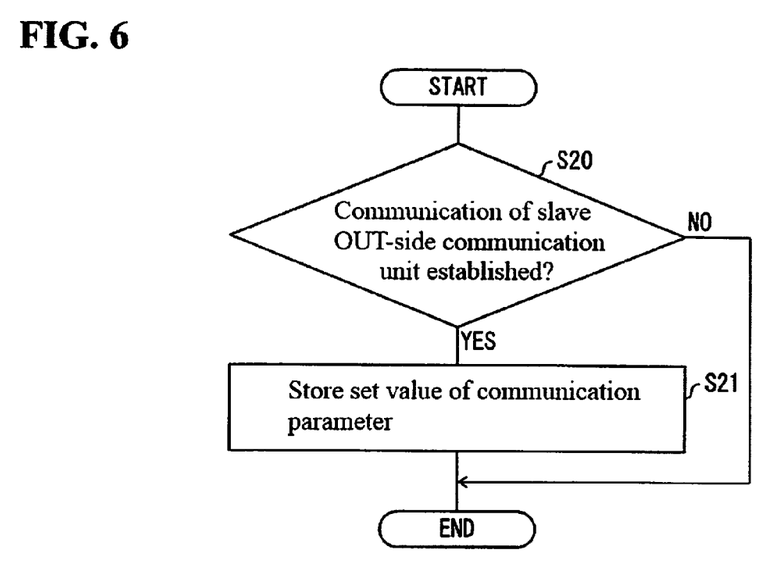
FIG. 6 is a flowchart showing a flow of processing for storing a value of a communication parameter in a master device, according to Embodiment 2 of the present invention.

Hereinafter, Embodiment 2 of the present invention will be described in detail with reference to FIGS. 6 and 7.

In the above-described embodiment, a configuration was used in which the slave device 20 stores the value of the communication parameter set for at least one of the slave IN-side communication unit 22 and the slave OUT-side communication unit 28, but the present invention is not limited to this. In the present embodiment, a configuration will be described in which the master device 10 stores the value of the communication parameter set for the slave OUT-side communication unit 28 and the master device 10 sets the value of the communication parameter of the slave OUT-side communication unit 28. Note that a configuration is used in which the master device 10 sets the value of the communication parameter of the slave OUT-side communication unit 28, and therefore the processing of the present embodiment is processing that is performed in a state in which communication between the master device 10 and the slave device 20 has been established. Also, since the configuration of the network system in the present embodiment is the same as the configuration of the network system 1 shown in FIG. 1, members having the same function as the members indicated in Embodiment 1 are denoted by the same reference numerals and description thereof will not be repeated here.

Processing of Master Device 10: Setting Method for Performing Communication Setting Processing for storing the value of the communication parameter in the master device 10 will be described with reference to FIG. 6. FIG. 6 is a flowchart showing a flow of processing for storing a value of a communication parameter in a master device 10, according to Embodiment 2 of the present invention.

Step S20

The slave OUT-side communication unit connection determination unit 14 makes an inquiry to the slave device 20 as to whether or not the communication of the slave OUT-side communication unit 28 of the slave device 20 has been established. Then, the slave OUT-side communication unit connection determination unit 14 determines whether or not communication of the slave OUT-side communication unit 28 has been established.

More specifically, the slave OUT-side communication unit connection determination unit 14 makes an inquiry via the master OUT-side communication unit 12 to the slave device 20 as to whether or not communication of the slave OUT-side communication unit 28 has been established. Upon receiving the inquiry via the slave IN-side communication unit 22, the slave connection determination unit 24 of the slave device 20 determines whether or not the communication of the slave OUT-side communication unit 28 has been established. Then, the slave connection determination unit 24 notifies the master device 10 of the determined determination result via the slave IN-side communication unit 22. Upon receiving the notification via the master OUT-side communication unit 12, the slave OUT-side communication unit connection determination unit 14 of the master device 10 references the determination result to determine whether or not the communication of the slave OUT-side communication unit 28 has been established.

Note that in the following description, the processing in which the slave OUT-side communication unit connection determination unit 14 makes an inquiry to the slave device 20 as to whether or not the communication of the slave OUT-side communication unit 28 has been established and the slave connection determination unit 24 performs notification in response to the inquiry is the same as the above-described processing, and therefore detailed description thereof will not be repeated.

Step S21: Storage Step

If it is determined in step S20 that "communication has been established" (step S20: YES), the slave OUT-side communication unit connection determination unit 14 stores the value of the communication parameter set for the slave OUT-side communication unit 28 in the master storage unit 18. A configuration may be used in which the slave connection determination unit 24 includes the value of the communication parameter set for the slave OUT-side communication unit 28 in the determination result, or a configuration may be used in which the slave OUT-side communication unit connection determination unit 14 makes an inquiry to the slave device 20 about the value of the communication parameter set for the slave OUT-side communication unit 28.

After the processing of step S21, if it is determined in step S20 that "communication has not been established" (step S20: NO), the processing of the master device 10 shown in FIG. 6 ends.

Note that the processing in which the master device 10 stores the value of the communication parameter set for the slave OUT-side communication unit 28 is not limited to the above-described configuration. For example, a configuration may be used in which the slave OUT-side communication unit 28 determines whether or not the slave OUT-side communication unit 28 has established communication (configuration C), or a configuration may be used in which the slave connection determination unit 24 determines whether or not the slave OUT-side communication unit 28 has established communication (configuration D).

In the case of the configuration C, if it is determined that the slave OUT-side communication unit 28 has established communication, the slave OUT-side communication unit 28 transmits the value of the communication parameter set for the slave OUT-side communication unit 28 to the master device 10 via the slave IN-side communication unit 22.

In the case of the configuration D, if it is determined that the slave OUT-side communication unit 28 has established communication, the slave connection determination unit 24 acquires the value of the communication parameter set for the slave OUT-side communication unit 28 and transmits the value to the master device 10 via the slave IN-side communication unit 22.

Next, communication setting in a preparatory stage for the slave device 20 to start communication will be described with reference to FIG. 7. FIG. 7 is a flowchart showing a flow of processing executed by the master device 10 in processing in a preparatory stage for the slave device 20 to start communication, according to Embodiment 2 of the present invention.

Step S30: Setting Step

Upon reaching a preparatory stage for the slave device 20 to start communication, the slave OUT-side communication unit setting unit 16 acquires the value of the communication parameter stored in the master storage unit 18. Then, the slave OUT-side communication unit setting unit 16 sets the acquired value of the communication parameter for the slave OUT-side communication unit 28.

More specifically, the slave OUT-side communication unit setting unit 16 transmits the value of the communication parameter to the slave device 20 via the master OUT-side communication unit 12. Upon receiving the value of the communication parameter via the slave IN-side communication unit 22, the slave setting unit 26 of the slave device 20 sets the acquired value of the communication parameter for the slave OUT-side communication unit 28.

Note that in the following description, the processing in which the slave OUT-side communication unit setting unit 16 transmits the value of the communication parameter to the slave device 20 and the slave setting unit 26 sets the value of the communication parameter for the slave OUT-side communication unit 28 is the same as the above-described processing, and therefore description thereof will not be repeated.

Step S31

The slave OUT-side communication unit connection determination unit 14 makes an inquiry to the slave device 20 as to whether or not the communication of the slave OUT-side communication unit 28 of the slave device 20 has been established. Then, the slave OUT-side communication unit connection determination unit 14 determines whether or not the communication of the slave OUT-side communication unit 28 has been established.

Step S32

If it is determined in step S31 that "communication has not been established" (step S31: NO), the slave OUT-side communication unit setting unit 16 sets a value different from the value of the communication parameter set in step S30 for the slave OUT-side communication unit 28.

Step S33

The slave OUT-side communication unit connection determination unit 14 makes an inquiry to the slave device 20 as to whether or not the communication of the slave OUT-side communication unit 28 of the slave device 20 has been established. Then, the slave OUT-side communication unit connection determination unit 14 determines whether or not the communication of the slave OUT-side communication unit 28 has been established.

Step S34

If it is determined in step S33 that "communication has not been established" (step S33: NO), the slave OUT-side communication unit setting unit 16 instructs the slave device 20 to set the value of the communication parameter corresponding to the communication setting of the communication destination with which the slave OUT-side communication unit 28 communicates for the slave OUT-side communication unit 28.

More specifically, via the master OUT-side communication unit 12, the slave OUT-side communication unit setting unit 16 instructs the slave device 20 to set the value of the communication parameter corresponding to the communication setting of the communication destination with which the slave OUT-side communication unit 28 communicates for the slave OUT-side communication unit 28. Examples of the instruction include an instruction to execute "Auto MDI/MDI-X" in a network system conforming to the Ethernet standard. Upon receiving the instruction via the slave IN-side communication unit 22, the slave setting unit 26 of the slave device 20 sets the value of the communication parameter corresponding to the communication setting of the communication destination with which the slave OUT-side communication unit 28 communicates for the slave OUT-side communication unit 28.

Figure 7:
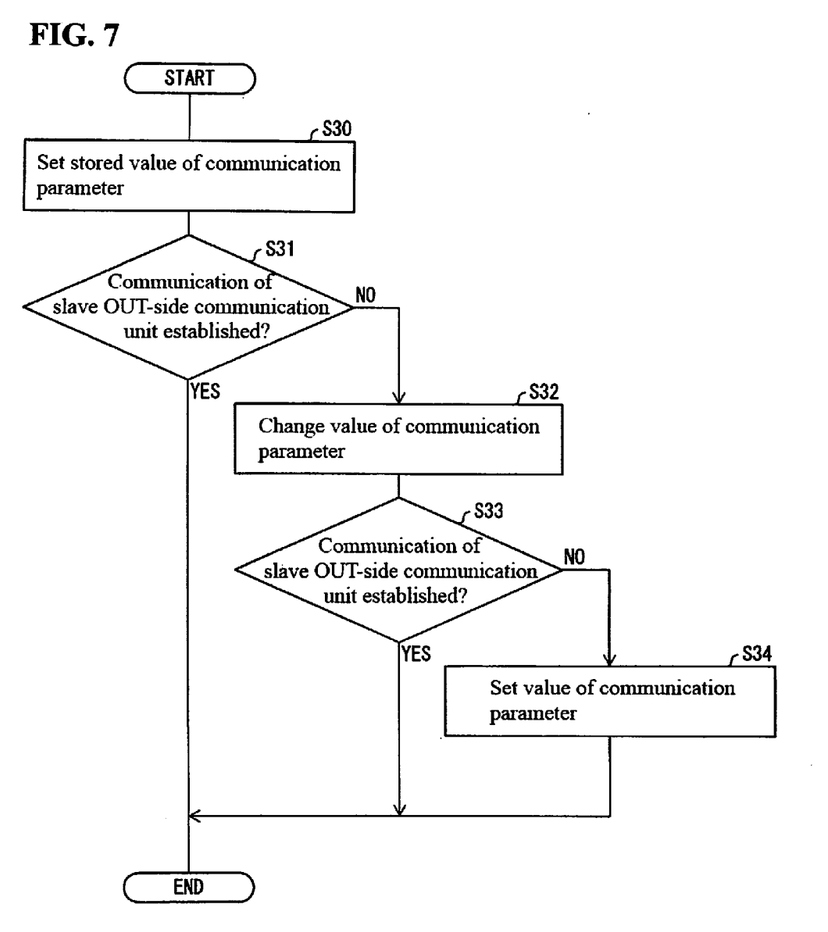
FIG. 7 is a flowchart showing a flow of processing executed by a master device in processing in a preparatory stage for a slave device to start communication, according to Embodiment 2 of the present invention.

The processing of the master device 10 shown in FIG. 7 ends after the processing of step S34, if it is determined in step S31 that "communication was established", or if it is determined in step S33 that "communication was established".

Thus, in the network system according to the present embodiment, the master device 10 stores the value of the communication parameter set for the slave OUT-side communication unit 28 in a state where the slave device 20 has established communication with the master device 10 and communication through the slave OUT-side communication unit 28, which is different from the slave IN-side communication unit 22 through which the slave device 20 communicates with the master device 10, has been established. Then, in the communication setting in a preparatory stage for the slave device 20 to start communication, the master device 10 sets the value of the communication parameter that was stored in advance for the slave OUT-side communication unit 28 for the slave device 20. For this reason, in the network system according to the present embodiment, if there is no change in the configuration (master device 10, slave device 20, cable, etc.), due to the value of the communication parameter that was stored in advance being set for the slave OUT-side communication unit 28, communication with the communication destination of the slave OUT-side communication unit 28 is possible. Accordingly, in the network system according to the present embodiment, there is no need to perform processing for checking the setting of the communication destination or re-checking processing caused by a link pulse collision that occurs during the processing, and thus delay in establishing communication can be suppressed.

Also, in the present embodiment, a case of using one slave OUT-side communication unit 28 was described, but the present invention is not limited to this configuration, and as described above, the slave device 20 may be configured to include multiple slave OUT-side communication units 28. In such a case, in step S20, the slave OUT-side communication unit connection determination unit 14 determines whether or not communication through each of the multiple slave OUT-side communication units 28 has been established. Then, in step S21, the slave OUT-side communication unit connection determination unit 14 stores each of the values of the communication parameters set for the multiple slave OUT-side communication units 28 in the master storage unit 18.

Also, in step S30, the slave OUT-side communication unit setting unit 16 sets the respective values of the communication parameters corresponding to the multiple slave OUT-side communication units 28 for the multiple slave OUT-side communication units 28. Then, in step S31 and step S33, the slave OUT-side communication unit connection determination unit 14 makes an inquiry to the slave device 20 as to whether or not the multiple slave OUT-side communication units 28 have established communication.

Also, if it is determined in step S31 that a slave OUT-side communication unit 28 has not established communication, in step S32, the slave OUT-side communication unit setting unit 16 sets the value of the communication parameter set in step S30 for that slave OUT-side communication unit 28 to a different value. Furthermore, if it is determined in step S33 that a slave OUT-side communication unit 28 has not established communication, in step S34, the slave OUT-side communication unit setting unit 16 instructs that slave OUT-side communication unit 28 to check the communication setting of the communication destination with which that slave OUT-side communication unit 28 communicates, and set the value of the communication parameter corresponding to the communication setting of the communication destination for the slave OUT-side communication unit 28.

Thus, the master device 10 in the present embodiment stores the values of the communication parameters set for the one or more slave OUT-side communication units (one or more ports) 28. If one or more of the slave OUT-side communication units 28 cannot establish communication in a predetermined amount of time, the master device 10 sets the values of the communication parameters stored in the master storage unit 18, which are the values of the communication parameters corresponding to the one or more slave OUT-side communication units 28 that were not able to establish communication, for the one or more slave OUT-side communication units 28 that were not able to establish communication. For this reason, it is possible to suppress delay in establishing communication also with a configuration in which the slave device 20 includes multiple slave OUT-side communication units 28.

Example of Implementation by Means of Software

The control blocks of the master device 10 and the slave device 20 may be realized by logical circuits (hardware) formed in an integrated circuit (IC chip) or the like, or may be realized by software using a CPU (Central Processing Unit).

In the latter case, the master device 10 and the slave device 20 each include a CPU for executing commands from a program, which is software for realizing functions, a ROM (Read Only Memory) or storage device (referred to as a "recording medium") on which the program and various types of data are recorded so as to be readable by a computer (or CPU), a RAM (Random Access Memory) for expanding the program, and the like. The object of the present invention is achieved by a computer (or a CPU) reading out the program from the storage medium and executing it. It is possible to use a non-temporary physical medium such as a tape, a disk, a card, a semiconductor memory, or a programmable logical circuit as the recording medium, for example. Also, the program may be supplied to the computer via any transfer medium through which a program can be transferred (e.g., a communication network, broadcast radio waves, etc.). Note that the present invention can be realized also in the form of data signals that are realized through electronic transfer by the program and are embedded in a carrier wave.

The present invention is not limited to the embodiments described above. The present invention can be modified in various ways without departing from the scope defined in the claims, and embodiments obtained by combining the technical means disclosed in different embodiments as appropriate are also included in the technical scope of the present invention.

INDUSTRIAL APPLICABILITY

The present invention can be used in a network system in which a master device and a slave device are connected by a cable.

The invention claimed is:

1. A method of setting a communication parameter in a network system, comprising:
    a master device comprising a master processor configured with a program to perform operations comprising operation as a master storage unit, a slave out-side communication unit setting unit, and a master out-side communication unit; and
    a slave device comprising a slave processor configured with a program to perform operations comprising operation as a slave out-side communication unit and a slave in-side communication unit, the method comprising:
    storing, in response to the slave device establishing communication with a communication destination via the slave out-side communication unit, a value of the communication parameter to the master storage unit, the master device and the slave device being connected via the master out-side communication unit and the slave in-side communication unit;
    setting, via the slave out-side communication unit setting unit, the communication parameter to equal the stored value; and
    setting, in response to the communication parameter being set to equal the stored value and the slave device failing to establish communication with the communication destination via the slave out-side communication unit, the communication parameter to a value different from the stored value, via the slave out-side communication unit setting unit, wherein
    the communication destination is a device other than the master device or the slave device.

2. The method according to claim 1, wherein
    the slave device fails to establish communication with the communication destination if the slave device and the communication destination cannot establish communication in a predetermined amount of time.

3. The method according to claim 1, wherein
    the slave processor is further configured with the program to perform operations comprising operation as a slave setting unit that checks a communication setting of the communication destination and performs communication setting such that communication with the communication destination can be established, and
    the slave setting unit, in response to the slave device failing to establish communication with the communication destination in a predetermined amount of time, performs setting for the slave device.

4. The method according to claim 1, wherein the communication parameter is at least one of a port type, a communication speed, and a full-duplex/half-duplex mode.

5. The method according to claim 1, wherein
    the slave out-side communication unit comprises a plurality of slave out-side communication units;
    the stored value comprises a plurality of stored values; and
    the communication destination comprises a plurality of communication destinations, each connected to a different slave out-side communication unit.

6. A communication device, in a network system comprising a master device and a slave device, the communication device functioning as the master device or the slave device and setting a communication parameter relating to communication of the communication device, wherein
    the communication parameter is at least one of a port type, communication speed, and full-duplex/half-duplex, and a memory is provided in a device other than the communication device, the memory storing a value of the communication parameter in a state in which communication has been established with a communication destination which is a device other than the master device or the slave device;
    the communication device comprising:
    a processor coupled to the memory and configured with a program to perform operations comprising:
    operation as a setting unit that sets the value of the communication parameter stored in the memory.

7. A network system comprising a master device and a slave device, the master device comprising:
    a master processor configured with a program to perform operations comprising operation as:
    a master out-side communication unit;
    a slave out-side communication unit setting unit;
    a slave out-side communication unit determination unit; and
    a master storage unit;
    the slave device comprising a slave processor configured with a program to perform operations comprising operation as:
    a slave in-side communication unit; and
    a slave out-side communication unit that establishes communication with a communication destination; wherein
    the communication destination is a device other than the master device or the slave device;
    the slave out-side communication unit determination unit determines whether the slave out-side communication unit has established communication with the communication destination;
    the master device and the slave device are connected via the master out-side communication unit and the slave in-side communication unit;
    the master storage unit stores a value of a communication parameter in a state in which the slave device has established communication with the master device and the communication destination;

the slave out-side communication unit setting unit sets the value of the communication parameter to equal the stored value; and the slave out-side communication unit setting unit sets, if the slave device cannot establish communication in a predetermined amount of time and the value of the communication parameter is equal to the stored values, the values of the communication parameter to a value different from the stored value.

8. The network system according to claim 7, wherein the communication parameter is at least one of a port type, a communication speed, and a full-duplex/half-duplex mode.

9. The network system according to claim 8, wherein the slave out-side communication unit comprises a plurality of slave out-side communication units;

the stored value comprises a plurality of stored values; and the communication destination comprises a plurality of communication destinations, each connected to a different slave out-side communication unit.

* * * * *